United States Patent

Kniebes et al.

[15] 3,686,930
[45] Aug. 29, 1972

[54] METHOD FOR MEASURING ODOR LEVEL IN NATURAL GAS

[72] Inventors: Duane V. Kniebes, La Grange; John Adrian Chisholm, Maywood; Robert C. Stubbs, Oak Forest, all of Ill.

[73] Assignee: Institute of Gas Technology, Chicago, Ill.

[22] Filed: May 7, 1970

[21] Appl. No.: 35,489

[52] U.S. Cl..................73/23.1, 73/23, 23/232 C
[51] Int. Cl..........................G01n 31/08, G01n 33/22
[58] Field of Search ....73/23.1, 23; 23/232 R, 232 C, 23/232 E; 356/187

[56] References Cited

UNITED STATES PATENTS 3,095,728  7/1963  Kindred et al..............73/23.1
3,489,498  1/1970  Brody........................356/187

OTHER PUBLICATIONS

Instrument Data Folder No. 143, Instrumentation Laboratory, Inc., Watertown, Mass.

"Determination of Petroleum Wax Odor by Chromatography," L. R. Durrett, Analytical Chemistry, Vol. 38, No. 6, May, 1966, pp. 745–748.

Primary Examiner—Richard C. Queisser
Assistant Examiner—C. E. Snee, III
Attorney—Dominik, Knechtel & Godula

[57] ABSTRACT

A method and apparatus which is particularly applicable to directly and objectively measure odor level in natural gas. The apparatus responds selectively to sulfur compounds in natural gas and produces an output signal proportional to the odor level of the gas, in the same manner as an "average" nose. A set of odor intensity factors developed empirically are applied to the output signal to provide a numerical value which expresses odor intensity of the gas in terms of a reference odorant compound.

9 Claims, 7 Drawing Figures

PATENTED AUG 29 1972 3,686,930

INVENTORS
Duane V. Kniebes
J. Adrian Chisholm
Robert C. Stubbs
BY
Dominik, Knechtel & Godula
ATTYS.

INVENTORS
Duane V. Kniebes
J. Adrian Chisholm
Robert C. Stubbs

BY *Dominik, Knechtel & Godula*

ATTYS.

METHOD FOR MEASURING ODOR LEVEL IN NATURAL GAS

This invention relates to a method and apparatus for measuring odor level in natural gas.

Most, if not all, utility gas companies are required by law to odorize the natural gas delivered to the consumers thereof, as a safety precaution. If a gas leak exists, the odorized gas is detected and the gas leak can be reported. However, if the odor level or intensity is too low, a gas leak may not be detected and serious consequences may occur. If the odor level is too high, on the other hand, the utility gas companies usually receive a large number of leak complaints, many of which are of no consequence, but must still be checked out. In this latter case, the majority of these complaints are a result of the slight quantities of gas that escape prior to ignition of the flame in gas stoves and the like. There is, therefore, an optimum odor level which the utility gas companies generally try to maintain.

Present methods of measuring odor level, however, are considered less than fully satisfactory by many utility gas companies, due to the need for a judgement by an operator to obtain a measurement. The most common method presently used is to determine odor thresholds by sniffing gas-air mixtures. The gas company personnel accomplish this with a portable "odorometer" in which the flowing gas-air mixtures can be accurately prepared and presented to an observer's nose. Although the same operator can usually repeat his readings on successive gas samples, different operators obtain somewhat different results because of normal variations in olfactory sensitivity among people. Accordingly, most utility companies are seeking an instrument or method of determining odor level which is less dependent upon the olfactory sensitivity of its operator.

The method and apparatus of the present invention, while applicable generally to measure sulfur compounds in gases, is particularly applicable to directly and objectively measure odor level in natural gas. The apparatus responds selectively to sulfur compounds in natural gas and produces an output signal proportional to the odor level of the gas, in the same manner as an "average" nose. A set of odor intensity factors developed empirically are applied to the output signal to provide a numerical value which expresses odor intensity of the gas in terms of a reference odorant compound.

The apparatus may be described as a dual column gas chromatograph equipped with a sulfur specific flame photometric detector. A gas sample is injected into the apparatus and as each compound emerges it is sensed by the detector which, in turn, operates a recorder to record a peak that indicates the quantity of that compound present in the sample. The time at which each peak appears identifies the specific compound being measured in the sample. The concentration of each of the specific compounds is determined, and then the empirically determined odor intensity factors are applied to calculate the contribution of each of these compounds to the odor level of the gas. The results are summed and the calculated value is a number that expresses the odor level of the gas in terms of the concentration of a pure reference compound that would give an equivalent odor. These latter computations preferably are derived electronically and the calculated value digitally displayed on the display device. By knowing the necessary concentration of the pure reference compound necessary or desirable to establish an acceptable odor level in the natural gas, the operator can easily and quickly determine whether the measured odor level is within an acceptable range.

In addition to recording and digitally displaying the measured odor level in the above-described fashion, the apparatus can be used in combination with an odorizing device to operate the latter to supply odorant material to a natural gas stream as necessary to maintain a pre-established acceptable level. The apparatus therefore can also be used to monitor the odor level of a natural gas stream and to control the operation of an odorizing device to maintain a pre-established odorant level in the stream.

Accordingly, it is an object of the present invention to provide an improved method and apparatus for directly and objectively measuring odor level in natural gas.

A still further object is to provide improved apparatus of the described type which provides an indication that expresses the odor level of the natural gas in terms of the concentration of a pure reference compound that would give an equivalent odor level.

Still another object is to provide improved apparatus of the described type which is operable in combination with an odorizing device to maintain a pre-established odorant level in a natural gas stream.

For a fuller understanding of the nature and objects of the invention, reference should be had to the following detailed description taken in connection with the accompanying drawings, in which.

Similar reference characters referred to similar parts throughout the several views of the drawings.

The instrument of the present invention, as indicated above, responds selectively to sulfur compounds in natural gas and produces an output signal proportional to the odor level of the gas as measured by an "average" nose. Accordingly, as a first step in developing the instrument, it was necessary to determine how each sulfur compound normally encountered in natural gas contributes to the total odor level of the gas. Next, each compound had to be assigned an olfactory response factor in an equation that relates these factors to a total odor level.

The development of such an equation required knowledge both of the odor intensity of the individual sulfur compounds and the manner in which their odors combine to produce an odor level for a mixture. The equation also had to be valid over the range of odor intensity of interest. Numerous prior attempts have been made to subjectively measure the intensity of odor, however, the results generally have been unsatisfactory, for one reason or another. The method used in the present invention for making these subjective measurements is unique in that all of the measurements were made with reference to a reference odor as a basis of comparison. Thus, an observer need only determine if an odor is greater than, less than, or equal in intensity to that of a reference. The equation developed then is used to convert sulfur compound content to an odor intensity in terms of equivalence to a concentration of pure reference compound. Using this method, the problems previously encountered in trying to make similar subjective measurements were overcome.

These relative odor intensities for the sulfur compounds were determined by panel tests in which observers compared pairs of odorant compounds in side-by-side tests. Mixtures were also tested to determine the way different odors combine to produce the total odor imparted to natural gas by their presence.

Figure 1:
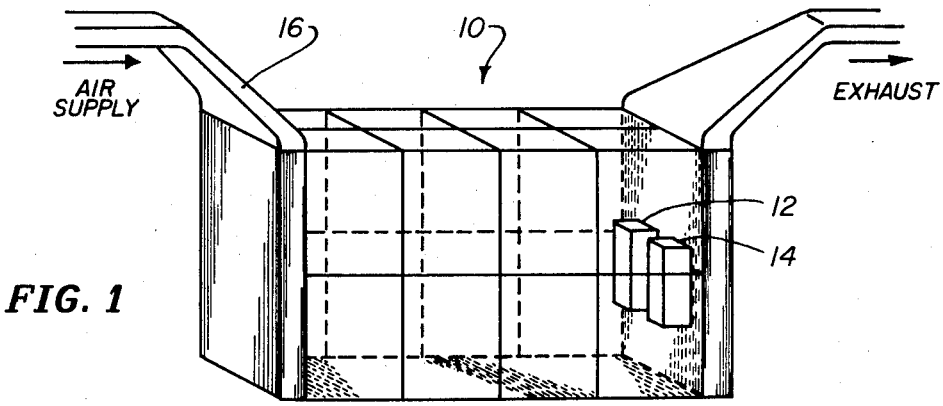
FIG. 1 is a perspective view of a test room exemplary of the test room used to conduct relative odor intensity tests.

These tests were conducted in a test room 10, such as the one illustrated in FIG. 1, which was specially designed and constructed for this purpose. The test room 10 is 8 feet wide, 12 feet long, and 8 feet high, and is constructed of glass, aluminum, and stainless steel which do not retain odors or act as sources of interfering odors. Air supplied to the test room is temperature and humidity-controlled and is filtered through activated charcoal. Air flow rate is approximately 1,500 cubic feet per minute, which provides about two air changes each minute.

Figure 2:
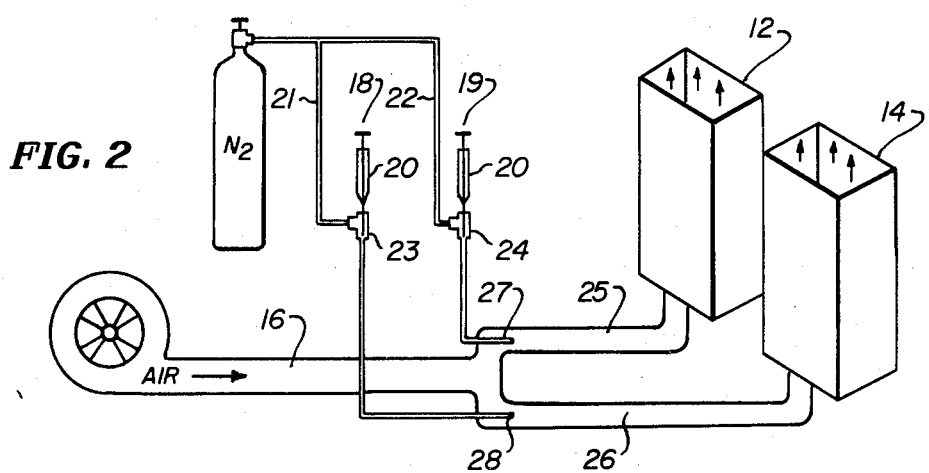
FIG. 2 is a view generally illustrating the manner in which the odorized air is supplied to the odor chambers of the test room of FIG. 1.

The odor comparison tests were carried out with two odor source chambers 12 and 14 attached to the exhaust wall of the test room 10. Odorized air to these chambers 12 and 14 is supplied in the manner illustrated in FIG. 2. About 200 cubic feet of air per minute is withdrawn from the inlet plenum 16 of the test room 10, split into equal portions, and supplied to the chambers 12 and 14. Odorant is added to the air supply of each chamber by means of microliter pumps 18 and 19, respectively. The speed of the pumps 18 and 19 and the size of the syringes 20 thereof are varied to produce different feed rates. The liquid odorant is injected directly into a stream of nitrogen flowing through ¼-inch tubes 21 and 22. The liquid odorant evaporates from the needle tips 23 and 24 and is carried to the air ducts 25 and 26 where perforated tubes 27 and 28 dispense the vapor uniformly into the air streams to the chambers 12 and 14.

The test procedure consisted of having a number of individuals on a panel determine the relationship between odor intensity and composition of odorant mixtures by comparing the odor intensities of pure compounds and their mixtures. The test procedure consisted of supplying the two odorant chambers 12 and 14 with air streams containing known concentrations of different odorants. The concentration of the odor compound in one of the odor chambers 12 and 14 was maintained constant for use as a reference. The concentration of the odor compound in the other one of the odor chambers 12 and 14 was varied stepwise, and at each level each of the observers was asked to make a judgement of relative intensities. A series of comparisons at different concentrations produced one concentration which each observer judged to be equal in odor intensity to the reference, and a number of other comparisons where the odor was judged to be weaker or stronger than the reference. A measure of consistency and repeatability was thereby obtained.

Using the data determined from these odor equivalence tests, the relative odor intensities were determined for a number of sulfur compounds, particularly those which contribute to the odor intensity of natural gas. The relative odor intensities of a number of the sulfur compounds which contribute to the odor intensity of natural gas, as determined in the manner described above, are set forth below in Table I, using n-Butyl Mercaptan as a reference compound.

TABLE I

| Compound | Retention time, min. | Average Relative Odor Intensity |
|---|---|---|
| Ethyl Mercaptan | 0.80 | 0.79 |
| Dimethyl Sulfide | 0.87 | 0.74 |
| Isopropyl Mercaptan | 1.38 | 0.64 |
| Methyl Ethyl Sulfide | 1.71 | 0.48 |
| n-Propyl Mercaptan | 1.72 | 0.62 |
| tert-Butyl Mercaptan | 2.06 | 0.73 |
| sec-Butyl Mercaptan | 2.96 | 1.45 |
| Methyl Isopropyl Sulfide | 2.98 | — |
| Isobutyl Mercaptan | 3.15 | 1.55 |
| Diethyl Sulfide | 3.34 | 0.16 |
| Methyl-n-Propyl Sulfide | 3.60 | 2.22 |
| n-Butyl Mercaptan | 3.83 | 1.00 |
| Dimethyl Disulfide | 4.10 | 0.54 |
| Thiophane | 5.62 | 1.19 |

Figure 3:
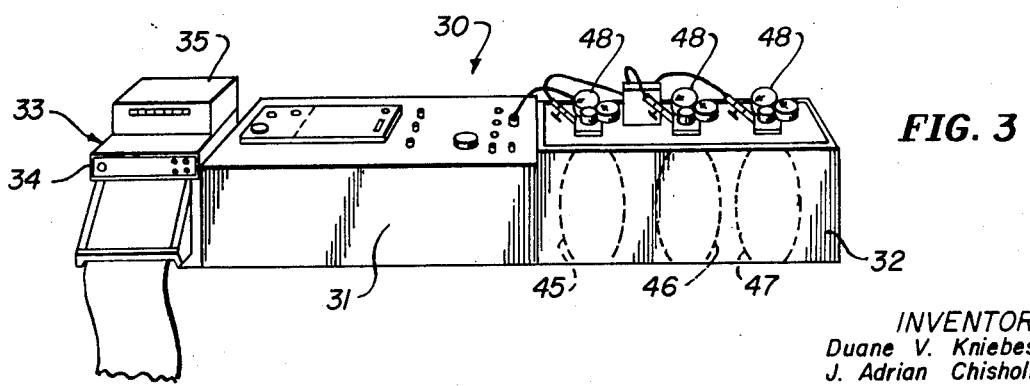
FIG. 3 is a pictorial-type perspective view of an instrument exemplary of the invention for measuring sulfur compounds in gases.

Referring now to FIG. 3, the instrument 30 for directly measuring the sulfur compounds in natural gas and for translating this measurement into the odor intensity of the gas can be seen to include an analyzer module 31, a gas supply module 32 and a display module 33 including a recorder 34 which may be a strip-chart recorder and a digital display 35. These modules are designed for portability so that the instrument 30 can be easily transported and assembled for operation, by a single operator. The instrument 30 operates essentially as a special-purpose chromatograph in that its detector, column, and operating conditions have been selected so that a response is obtained only to those sulfur compounds that contribute odor to natural gas. The response is an "odor profile" which, upon being recorded by the recorder 34, is of the type shown in FIG. 5. This "odor profile" is provided in less than 6 minutes.

Figure 4:
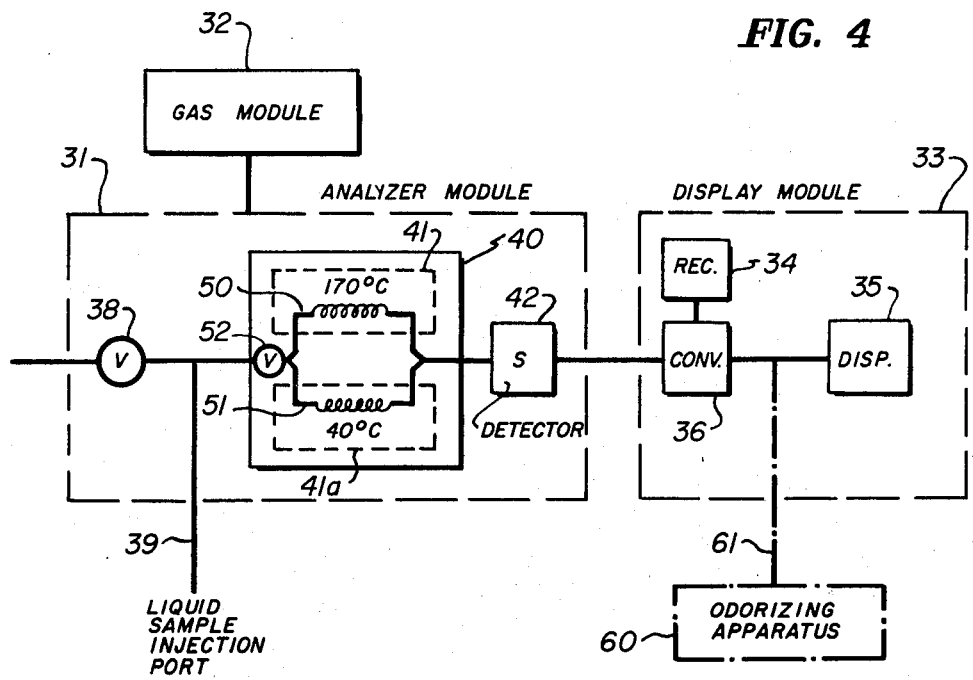
FIG. 4 is a block diagram-type schematic of the instrument of FIG. 3.

The analyzer module 31, as can be best seen in FIG. 4 which is a block diagram-type schematic of the instrument 30 includes a gas sampling valve 38, a liquid sample injection port 39, a column switching valve 52, a chromatographic column 40 including a pair of columns 50 and 51 which are contained in temperature-controlled ovens 41 and 41a, respectively, and a flame photometric detector 42 with its associated photomultiplier tube and amplifier circuits for providing an output signal to the display module 33.

The gas supply module 32 contains three sources of gas, nitrogen, oxygen and hydrogen for operating the analyzer module 31. These gases are contained in small, high-pressure spherical bottles 45, 46, and 47, respectively, that are equipped with miniature, 2-stage regulators 48. Valves and flowmeters (not shown) also are provided for supplying exact flows of each gas to the chromatographic column 40 and the detector 42. Nitrogen is used as the carrier gas in the chromatographic column 40 and is mixed with oxygen at the burner base in the detector 42. Hydrogen is supplied for the burner fuel and to provide a reducing atmosphere. Sufficient hydrogen is carried in the gas supply module 32 for 40 hours of continuous operation, while the oxygen and nitrogen supply will last for 160 hours because of the lower flow rates used. When installed as a permanent installation as a control instrument for controlling the operation of an odorizing apparatus, the gas supply module 32 advantageously is replaced with a continuous supply of gases for operating the analyzer module 31.

The chromatographic column 40 of the analyzer module 31 includes the two columns 50 and 51, each of which is in the form of three-sixteenths-inch stainless steel tube, 3½ feet in length, packed with silanized Porapak Q coated with 5 percent silicone oil QF1-6500. Other packings for the columns 50 and 51 can be used which separate the sulfur compounds, however, it has been found that the use of this silanized packing coated with silicone oil effectively prevents loss of the sulfur compounds by adsorption on the packing material. With many other types of packing, substantial loss of these compounds by adsorption on the packing material is experienced.

The column 50 is operated at approximately 30°–40 °C and is used to determine compounds boiling in the range of hydrogen sulfide to methyl mercaptan. The column 51, on the other hand, is operated at approximately 160°–180°C, and is used to determine compounds boiling in the range of ethyl mercaptan to normal amyl mercaptan.

The flame photometric detector 42 is sensitized to sulfur and measures the odorant compounds eluting from the chromatographic column 40. This detector 42 may be a Micro Tek flame photometric flame emission detector which is highly sensitive to sulfur and can respond to as little as 5 parts per billion of mercaptan in a 25 ml gas sample. The detector 42 also is insensitive to hydrocarbons. Only the light natural gas hydrocarbons produce any interference, and this occurs prior to the elution of odorant sulfur compounds.

The flame photometric detector 42 is physically similar to a hydrogen flame ionization detector, however, in this application, a hydrogen-rich atmosphere surrounds the flame, and light emitted from the region above the flame cone is monitored by a photomultiplier tube. When sulfur is present in the sample being burned in the flame, a blue light with a wavelength of 394 millimicrons is emitted. An optical filter allows only light of this wavelength to impinge on the photomultiplier tube. The output of the photomultiplier tube therefore is proportional to the intensity of light, which, in turn, is proportional to the quantity of sulfur passing through the flame.

As each sulfur compound elutes from the chromatographic column 40, the amplifier circuits (not shown) associated with the detector 42 provide an output to the display module 33, to indicate the quantity of that compound present in the sample. The time at which each compound elutes from the chromatographic column 40, as indicated by the peaks recorded by the recorder 34, in the manner described more fully below, identifies the specific compound being measured in the sample.

A typical test of gas odor level with the instrument 30 can be described as follows. The natural gas to be analyzed is connected to the stainless steel gas sampling valve 38 which is the inlet port of the analyzer module 31. Prior to testing a sample of natural gas, the instrument 30 preferably is first calibrated, by injecting a liquid standard in the form of a known concentration of a sulfur compound in alcohol into it. About 15 minutes are required to stabilize the oven temperature from an ambient temperature start. The liquid standard, as well as the gas samples, requires approximately 6 minutes to elute from the chromatographic column 40, to provide an "odor profile," as explained more fully below.

In Table 1 above, the retention time, in minutes, of a number of the most commonly encountered odorants in natural gas are tabulated. As each of the sulfur compounds elutes from the column 40, they are detected by the flame photometric detector 42, in the manner described above, and an output is provided to the display module 33. The recorder 34 of the display module 33 is operated thereby, to provide an "odor profile" in the form of one or more recorded peaks, each separated by a period of time.

Figure 5:
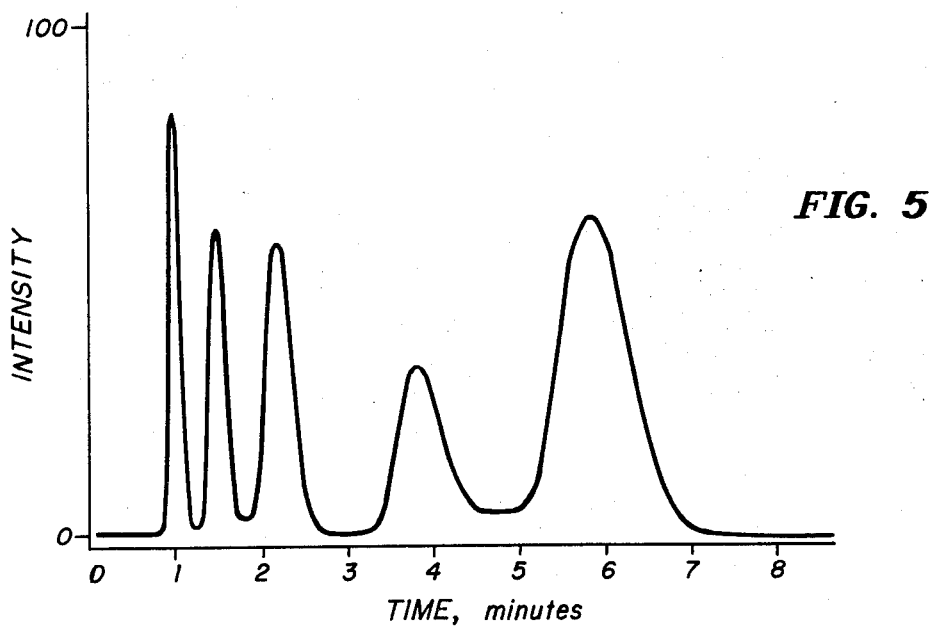
FIG. 5 is an illustration of an "odor profile" derived from the instrument of FIGS. 3 and 4.

Assuming that the odor profile of FIG. 5 was recorded by the recorder 34, upon injecting the liquid standard into the instrument 30, and by referring to this odor profile and Table 1, it can be seen that the liquid standard is an odor mixture of, from left to right, the sulfur compounds dimethyl sulfide, isopropyl mercaptan, tert-butyl mercaptan, n-butyl mercaptan, and thiophane. The results of this calibration run are used to confirm proper operation of the instrument, and to allow adjustments to be made for slight shifts in instrument sensitivity and column performance.

After the instrument 30 has been calibrated, the gas sampling valve 38 is rotated, to inject a 25 ml sample of the natural gas into the chromatographic column 40. As indicated above, nitrogen is used as a carrier gas to flush the sample through the column 40. Again, as each of the sulfur compounds elutes from the column 40, they are detected by the flame photometric detector 42 and the odor profile is recorded by the recorder 34.

Figure 6:
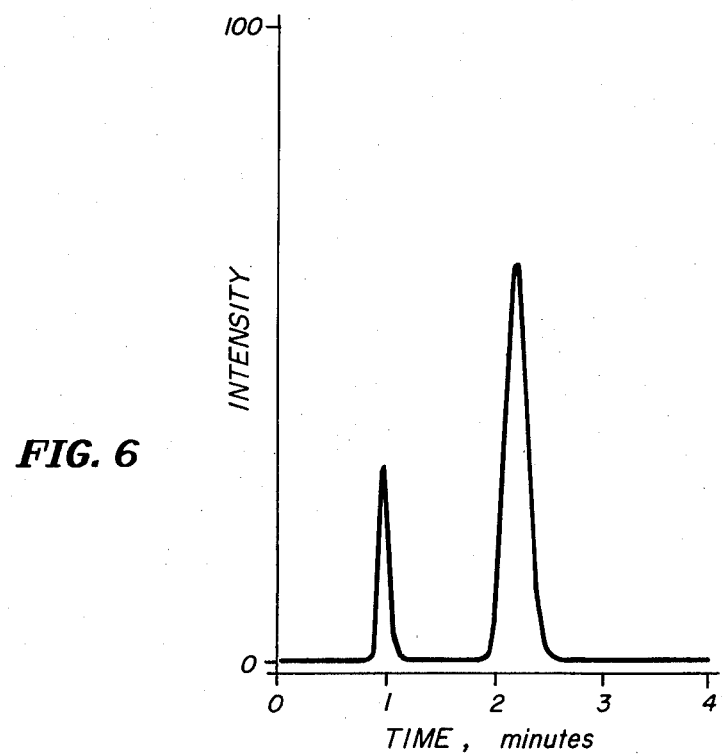
FIGS. 6 and 7 are two additional illustrations of "odor profiles" found in two sources of natural gas.
Figure 7:
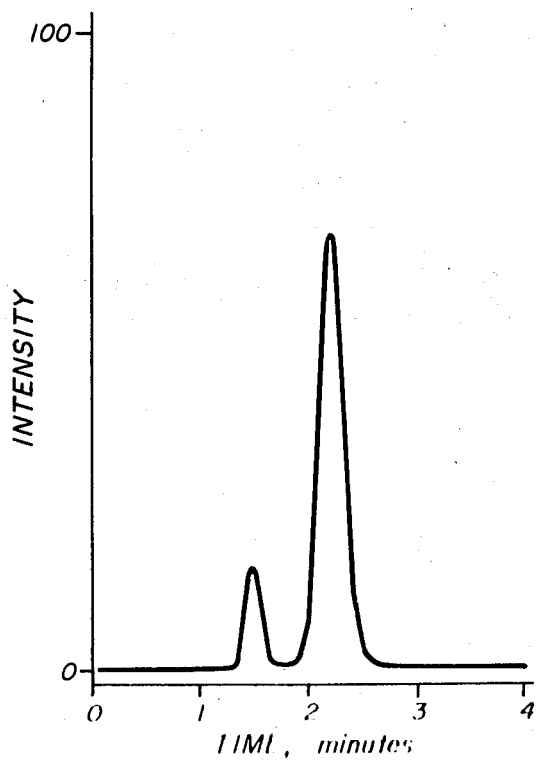

Several representative odor profiles which may be recorded are shown in FIGS. 6 and 7. From these odor profiles and the retention times listed in Table 1, it can be seen that the odor mixtures of FIGS. 6 and 7 are both tert-butyl mercaptan types, as evident from the large peak that occurs just after 2 minutes. The smaller peak in FIG. 6 shows that the odorant also contains dimethyl sulfide, and the smaller peak in FIG. 7 shows that this odorant also contains isopropyl mercaptan.

Using the recorded odor profile, the total odor intensity of the gas can be determined. This may be accomplished as follows. The area under each recorded peak is determined, in a manner well-known in the field of chromatography, and then the concentration of the odorant is determined by comparing the determined value with a known standard of the same odorant. For example, assume that the area under the dimethyl sulfide peak in FIG. 6 is determined to be 500 mm², and that it is known that an equal volume of a standard sample containing 2 parts per million (ppm) of dimethyl sulfide provides a peak having an area of 400 mm². From the equation, $$\frac{500 \text{ mm.}^2}{400 \text{ mm.}^2/2 \text{ p.p.m.}} = 1.25 \times 2 \text{ p.p.m.}$$

it is determined that the concentration of dimethyl sulfide in the gas is 2.5 ppm.

Having now determined the concentration of the dimethyl sulfide in the gas, its odor intensity is determined by applying the relative odor intensity from Table 1, in this case 0.74, to the concentration in accordance with the equation, $$2.5 \text{ ppm} \times 0.74$$

to determine that its odor intensity is 1.85 in terms of the concentration of the pure reference compound which, in this case, is n-butyl mercaptan. After the odor intensity of the odorant indicated by the second peak in FIG. 6, in this case, tert-butyl mercaptan, is determined in the same manner, these two computed values are added and the result indicates that the gas has an odor equivalent to that of a gas containing, for example, 4.0 ppm of n-butyl mercaptan.

Knowing this value, it can be compared to a pre-established range of values indicating the acceptable range of odor level in the natural gas, for n-butyl mercaptan. In the case of n-butyl mercaptan, an acceptable range may be, for example, 1–10 ppm of n-butyl mercaptan. Accordingly, the odor level of the gas in the above assumed example would be within the acceptable range.

Results of the mixture tests indicate that a number of the sulfur compounds such as, for example, the mercaptans and thiophane, are additive in producing a total odor intensity. The sulfides, on the other hand, gave indications of synergism with some mercaptans, resulting in an enhanced odor intensity. Accordingly, in those cases where the odor profiles indicate that the gas contains a mixture of odorants, such as in the case of the odor profiles of FIGS. 6 and 7, the odor intensity of each of the detected sulfur compounds is determined in the manner described above and then all are added to provide an indication of the total odor intensity. In those cases where a synergistic effect is indicated, the enhancement of the odor intensity can be compensated for by applying a compensating factor.

The instrument 30 is adapted to perform the above mathematical computations electronically, and to provide a numerical value read-out of the total odor intensity on the digital display 35. As can be best seen in FIG. 4, the display module 33 includes a convertor 36 included in the coupling between the output of the flame photometric detector 42 and the inputs to the recorder 34 and the digital display 35. This convertor 36 determines the concentrations of each sulfur compound, and applies the relative odor intensity factor to each of the determined concentrations and then adds the results to thereby compute the total odor intensity so that the numerical value displayed by the digital display 35 indicates that the gas has an odor equivalent to that of a gas containing the indicated concentration of a pure reference compound. With this digital indication, it therefore can be easily and quickly determined whether the odor level of the gas is within the acceptable range.

The instrument 30, as indicated above, also can be used to control the operation of an odorizing apparatus such as a variable rate pump that pumps liquid odorants into a natural gas pipeline. Odorizing apparatus of this type is commonly controlled only by a gas flow rate sensor so that a pre-established volume of liquid odorant is evaporated into a given volume of natural gas. In such an application, the instrument 30 is adapted so that a sample of the odorized natural gas is periodically injected into the chromatographic column 40. The odorants are detected and measured in the manner described above, and the output of the convertor 36 is coupled to the odorizing apparatus 60 via the conductor 61, as illustrated in FIG. 4. If the odor level is below a pre-established minimum acceptable level, the odorizing apparatus 60 is operated to supply additional odorant material to the natural gas stream.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A method for measuring odor intensity of sulfur compounds in gas in terms of a reference compound comprising the steps of: separating the different sulfur compounds in a predetermined volume sample of said gas; detecting each of said separated sulfur compounds; determining the concentration of each of said separated and detected sulfur compounds; and determining the odor intensity of an equivalent concentration of said reference compound by applying to said determined concentration of each of said separated and detected sulfur compounds a relative odor intensity factor empirically determined by having a panel of individuals sniff different concentrations of each of a plurality of different sulfur compounds and compare the odor thereof with a known concentration of said reference compound to determine the concentration of each of said plurality of different sulfur compounds which is equivalent in odor intensity to said known concentration of said reference compound.

2. The method of claim 1, further including the step of: summing the determined odor intensity of an equivalent concentration of said reference compound for each of said separated and detected sulfur compounds to provide a determination of the total concentration of all of said separated and detected sulfur compounds in said sample of gas in terms of the odor intensity of an equivalent concentration of said reference compound.

3. The method of claim 2, further including the step of: comparing the determined odor intensity of an equivalent concentration of said reference compound with a pre-determined range of concentrations of said reference compound which is known to provide an acceptable odor intensity level in gas, to thereby provide a means of determining whether the odor intensity of said gas is at an acceptable level.

4. The method of claim 1, comprising the steps of separating the different sulfur compounds in a predetermined volume sample of said gas using a gas chromatograph; detecting each of said separated sulfur compounds using a sulfur specific detector which provides an electrical output signal representative of the concentration of each of the respective ones of said separated and detected sulfur compounds; recording each of said electrical output signals to as to provide an odor profile of the sulfur compounds in said gas; determining the concentration of each of said separated and detected sulfur compounds from said recorded odor profile; and determining the odor intensity of an equivalent concentration of said reference compound by applying said relative odor intensity factor to said determined concentration of each of said separated and detected sulfur compounds.

5. The method of claim 4, further including the step of: summing the determined odor intensity equivalent concentrations of said reference compound for each of said separated and detected sulfur compounds to provide a determination of the total concentration of all of said separated and detected sulfur compounds in said sample of gas in terms of the odor intensity of an equivalent concentration of said reference compound.

6. The method of claim 5, comprising the steps of separating the different sulfur compounds in a predetermined volume sample of said gas using a gas chromatograph; detecting each of said separated sulfur compounds using a sulfur specific detector which provides an electrical output signal representative of the concentration of each of the respective ones of said separated and detected sulfur compounds; recording each of said electrical output signals so as to provide an odor profile of the sulfur compounds in said gas; determining the concentration of each of said separated and detected sulfur compounds from said recorded odor profile and determining the odor intensity of an equivalent concentration of said reference compound by applying said relative odor intensity factor to said determined concentration of each of said separated and detected sulfur compounds.

7. The method of claim 1, comprising the steps of separating the different sulfur compounds in a predetermined volume sample of said gas using a gas chromatograph; detecting each of said separated sulfur compounds using a sulfur specific detector which provides an electrical output signal representative of the concentration of each of the respective ones of said separated and detected sulfur compounds; determining the concentration of each of said separated and detected sulfur compounds, determining the odor intensity of an equivalent concentration of said reference compound of each of said separated and detected sulfur compounds and summing the determined odor intensity equivalent concentrations of said reference compound using electrical convertor means which is responsive to said electrical output signals from said detector and is operable to provide an electrical output signal representative of the total concentration of said separated and detected sulfur compounds in terms of the odor intensity of an equivalent concentration of said reference compound; and providing a numerical display of the total odor intensity of an equivalent concentration of said reference compound using an electrical digital display device which is responsive to the electrical output signal from said convertor means.

8. The method of claim 7, further including the steps of recording each of said electrical output signals from said detector so as to provide an odor profile of the sulfur compounds in said gas.

9. The method of claim 1, comprising the steps of separating the different sulfur compounds in a predetermined volume sample of said gas using a gas chromatograph; detecting each of said separated sulfur compounds using a sulfur specific detector which provides an electrical output signal representative of the concentration of each of the respective ones of said separated and detected sulfur compounds; determining the concentration of each of said separated and detected sulfur compounds, determining the odor intensity of an equivalent concentration of said reference compound of each of said separated and detected sulfur compounds and summing the determined odor intensity equivalent concentrations of said reference compound using electrical convertor means which is responsive to said electrical output signals from said detector and is operable to provide an electrical output signal representative of the total concentration of said separated and detected sulfur compounds in terms of the odor intensity of an equivalent concentration of said reference compound; and operating an odorizing device to supply additional odorant material to the gas from which said sample of gas was taken when said electrical output signal from said convertor means is of a value corresponding to a concentration of said reference compound less than a pre-established minimum acceptable odor level, to thereby maintain an acceptable odor level in said gas.

* * * * *